Oct. 4, 1932.  W. P. DRYER  1,880,903
HUMIDIFYING
Filed May 7, 1930
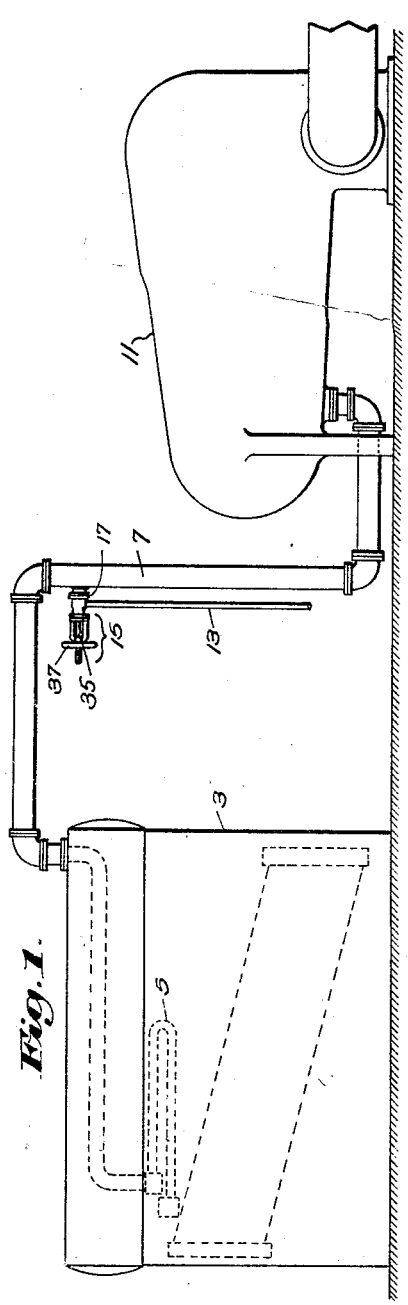
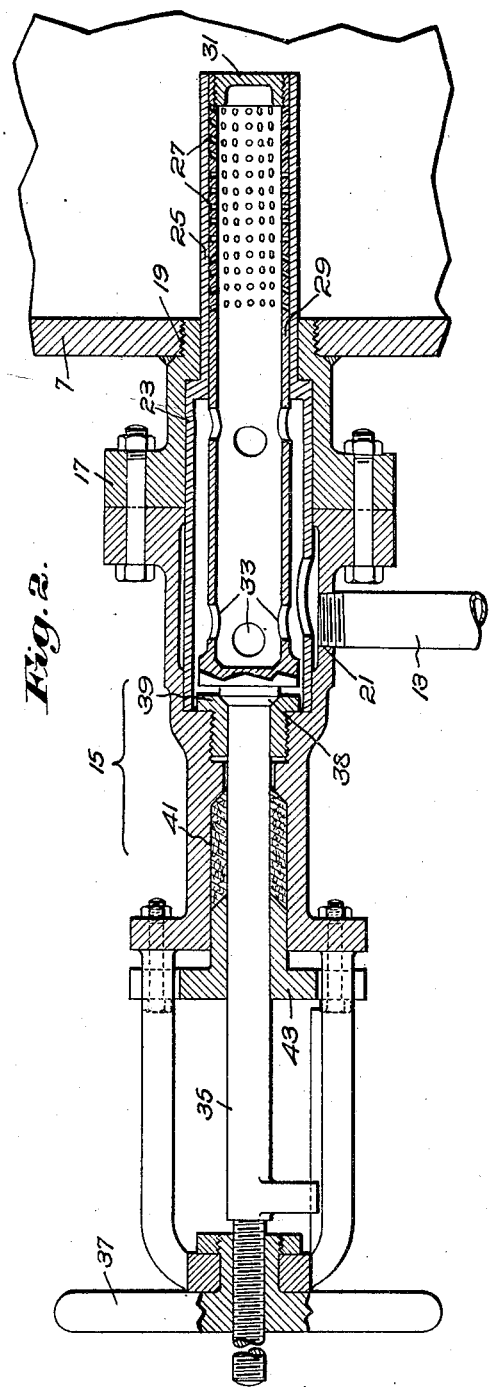
Inventor:
William P. Dryer,
by Emery, Booth, Varney, Townsend
Attys.

Patented Oct. 4, 1932

1,880,903

UNITED STATES PATENT OFFICE

WILLIAM POOLE DRYER, OF NEWTON, MASSACHUSETTS

HUMIDIFYING

Application filed May 7, 1930. Serial No. 450,405.

This invention relates to humidifying and in its more specific aspects to a method and mechanism whereby the superheated steam supplied to turbines may be temporarily wetted to clean the engines without shutting them down or otherwise interrupting the normal operation of the plant.

My invention may be well understood from the following description by way of example of such specific application and embodiment thereof taken in connection with the accompanying drawing, wherein:

Fig. 1 is a diagrammatic showing of portions of a steam turbine plant; and

Fig. 2 is a central longitudinal section through the water injection device.

In the operation of steam turbines driven by superheated steam, solid non-volatile matter in the boiler water is carried over into the engines and adheres to the blades and nozzles, finally materially reducing the efficiency of the engines. It has been found that if water is introduced into the steam so that the turbines temporarily run on wet steam, the deposits are loosened and washed out. In accordance with my invention I provide means for treating the steam in this manner whereby the steam may be cooled very gradually, say perhaps at the rate of a degree a minute, and whereby the possible introduction of slugs of water into the steam current which might be carried into the engine as liquid is avoided.

Referring to Fig. 1 of the drawing, I have there shown a boiler furnace 3 with a superheater 5 supplying steam through the supply pipe 7 to the turbine 11. Water may be supplied through pipe 13 and, under control of an injection device 15, admitted to the steam in the pipe 7.

In accordance with the invention the steam flowing through the pipe 7 is humidified by the injection of water therein under a substantially constant head and through a gradually increased number of minute openings. Suitable mechanism for effecting this is shown in detail in Fig. 2 and may comprise a casing 17 having means at one end, as the threaded portion 19, whereby it may be secured to a wall of the pipe 7. A connection is made at 21 for the water supply pipe 13. The casing is here shown as provided with a liner 23 having a tubular extension 25 adapted to project into the pipe 7. This liner is conveniently made of chrome steel alloy to resist the action of the steam. The projecting tube 25 herein forms a valve for the ports provided by a multiplicity of minute perforations 27 formed in the inner end of a tube 29 fitting within the extension 25. Tube 29 may be closed by the plug 31 at its outer end and formed as a cylinder, intake ports 33 for the water being provided adjacent its outer end.

Provision is made for relatively moving the two tubes gradually to uncover the ports 27 and herein the inner tube 29 is projected inwardly within the extension 25 and into the steam current, gradually exposing beyond the end of the extension more and more of the perforations 27. For this purpose the member 29 may be provided with a stem 35 rearwardly extending through the casing and threaded at its outer end to cooperate with a feed nut 37 in the form of a hand wheel, by the operation of which the inner tube may be slowly advanced.

In the construction shown the stem 35 carries an enlargement 38 which in the retracted position seats as a valve on thimble 39 preventing leakage of water around the stem and relieving the packing 41, which is compressed by the usual gland 43.

By the arrangement shown water may be supplied under adequate pressure through pipe 13 and will be sprayed out through the orifices 27 and effectively vaporized in the steam current. It is easy to supply the water very gradually so that the temperature of the steam is very gradually lowered, as it should be.

In the annexed claims I use the word "gas" in contradistinction to "liquid" whether the fluid in question be technically a gas or vapor, and by "humidifying" I mean the introduction of moisture whether or no the resulting mixture is "wet". Thus, for example, the method and apparatus may be used for decreasing the super-heat of steam, the resultant product not necessarily being saturated.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:

1. Mechanism for humidifying to a desired degree a stream of gas which comprises, in combination with a conduit for the stream, a liquid injection tube having a multiplicity of small perforations in the side thereof for the exit of liquid, means for gradually projecting said tube into the stream, and means closing the perforations of the unprojected portion of the tube.

2. Mechanism for humidifying to a desired degree the steam supply of a turbine comprising, in combination with a supply pipe, an injection device having a number of minute openings, means to supply water directly thereto under substantially constant head and means for gradually increasing the number of said openings exposed to the steam current.

3. Means for introducing liquid into a current of gas comprising an injection device having a multiplicity of small openings, means for supplying liquid thereto under substantially constant head and means for varying the number of the openings exposed to the conduit.

4. In combination with a steam turbine and its supply pipe, a tube projecting into the pipe, a tube having a closed end fitting within the first tube and having a multiplicity of perforations, means accessible at the exterior of the pipe for relatively moving the tubes progressively to expose such perforations and means to supply liquid to the interior of said second tube.

5. An injection device for delivering a spray comprising a base providing means for attaching it to the wall of a pipe, a pair of nested tubes extending therefrom to project into the pipe for exposure therein, one at least of said tubes having a multiplicity of perforations constituting exit ports and the other constituting a valve therefor, a connection for supplying liquid to be discharged from said ports, and means at the outer end of the fitting for progressively relatively reciprocating one of said tubes axially over the other.

6. An injection device for delivering a spray comprising a base providing means for attaching it to the wall of a pipe, a pair of nested tubes extending therefrom to project into the pipe for exposure therein, the inner tube having a multiplicity of perforations constituting exit ports and the outer tube constituting a valve therefor, a connection for supplying water to the inner tube to be discharged from said ports, and means at the outer end of the fitting for moving the end of the inner tube beyond the outer progressively to expose said perforations.

7. An injection device for delivering a spray comprising a casing having means at one end providing for attaching it to the wall of a pipe, and a water inlet, a tube extending therefrom to project into the pipe, a cylinder fitting said tube having intake ports at its outer end and a multiplicity of small perforations constituting exit ports at its inner end and opposing said tube, a threaded stem extending rearwardly from the cylinder and a feed nut cooperating with the stem.

8. An injection device for delivering a spray comprising a casing having a base provided with means for attaching it to the wall of a pipe and presenting a part pierced with minute perforations constituting exit ports past which the current in the pipe may flow, a cooperating part providing a valve for said perforations, a liquid inlet to said casing, and means accessible at the exterior of the casing for relatively moving said parts for selectively opening and closing more or less of said perforations.

In testimony whereof, I have signed my name to this specification.

WILLIAM POOLE DRYER.